United States Patent
Sakagami et al.

(10) Patent No.: US 7,551,980 B2
(45) Date of Patent: Jun. 23, 2009

(54) APPARATUS, PROCESS, AND PROGRAM FOR CONTROLLING MOVABLE ROBOT CONTROL

(75) Inventors: Yoshiaki Sakagami, Saitama (JP); Shinichi Matsunaga, Saitama (JP); Nobuo Higaki, Saitama (JP); Naoaki Sumida, Saitama (JP); Takahiro Oohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 873 days.

(21) Appl. No.: 10/814,782

(22) Filed: Apr. 1, 2004

(65) Prior Publication Data
US 2004/0199292 A1 Oct. 7, 2004

(30) Foreign Application Priority Data
Apr. 1, 2003 (JP) ............... 2003-097593

(51) Int. Cl.
*G06K 9/32* (2006.01)
*G06F 3/01* (2006.01)

(52) U.S. Cl. ............... 700/258; 700/245; 382/103; 382/116; 382/190; 446/175; 318/568.16; 704/270

(58) Field of Classification Search .............. 700/245, 700/246, 259
See application file for complete search history.

(56) References Cited

U.S. PATENT DOCUMENTS

| 6,556,892 | B2 * | 4/2003 | Kuroki et al. ............ 700/245 |
| 7,152,050 | B2 * | 12/2006 | Aoyama et al. ............ 706/12 |
| 2004/0024490 | A1 * | 2/2004 | McLurkin et al. .......... 700/245 |
| 2004/0230340 | A1 * | 11/2004 | Fukuchi et al. ............ 700/245 |

FOREIGN PATENT DOCUMENTS

| DE | 10066147 | C1 * | 10/2003 |
| GB | 2258098 | A  * | 1/1993 |
| JP | 01-154661 |    | 6/1989 |
| JP | 03-006710 |    | 1/1991 |
| JP | 03006710 | A  * | 1/1991 |
| JP | 06-343334 |    | 12/1994 |
| JP | 08-22324 |    | 1/1996 |

(Continued)

OTHER PUBLICATIONS

Harai, N. and Mizoguchi, H. Visual Tracking of Human Back and Shoulder for Person-following Robot, Proceedings 2003 IEEE/ASME Int. Conf. on Advanced Intelligent Mechatronics (AIM 2003) pp. 527-532.*

(Continued)

*Primary Examiner*—Thomas G Black
*Assistant Examiner*—Lin B Olsen
(74) *Attorney, Agent, or Firm*—Squire, Sanders & Dempsey L.L.P.

(57) ABSTRACT

An apparatus 1 for controlling a movable robot recognizes the person to be followed up from an image taken by a camera C by an image processing portion 20, controls leg portions R1 of a movable robot A so as to keep a prescribed interval between the movable robot A and the person by a portion 50 for detecting an action, and notify the degree of the distance between the movable robot A and the person to the person by a voice from a voice outputting portion 62.

11 Claims, 5 Drawing Sheets

FOREIGN PATENT DOCUMENTS

| | | |
|---|---|---|
| JP | 08-166822 | 6/1996 |
| JP | 10-171533 | 6/1998 |
| JP | 10-289006 | 10/1998 |
| JP | 11-073582 | 3/1999 |
| JP | 11-175151 | 7/1999 |
| JP | 2000-112523 A | 4/2000 |
| JP | 2000-113399 A | 4/2000 |
| JP | 2001-142676 | 5/2001 |
| JP | 2001-188555 | 7/2001 |
| JP | 2001-277163 | 10/2001 |
| JP | 2002-41146 | 2/2002 |
| JP | 2002-205290 | 7/2002 |
| JP | 2003-32323 | 1/2003 |
| JP | 2005202076 A * | 1/2004 |

OTHER PUBLICATIONS

Kaplan, F., Talking AIBO: First Experimentation of Verbal Interactions with an Autonomous Four-legged Robot, Proceedings of the CELE-Twente workshop in interacting agents 2000.*

Xu, L., Zein-Sabatto, S. and Sekman, A., Development of Intelligent Behaviors for a Mobil Robot. 0-7803-6661-1/01/ © 2001 IEEE pp. 383-386.*

Biron—the Bielefeld Robot Companion, http://www.techfak.net/ags/ai/projects/BIRON/welcome.html.*

Schlegel, C., Illmann, J. Jaberg, H, Schuster, M. and Worz, R., Vision Based Person tracking with Mobile Robot, British Machine Vision Conference, 1998, pp. 418-427.*

Shuyin Li, Marcus Kleinhagenbrock, Jannick Fritsch, Britta Wrede, and Gerhard Sagerer, ""BIRON, let me show you something": Evaluating the Interaction with a Robot Companion", 2004 IEEE International Conference on Systems, Man and Cybernetics, 0-7803-8566-7/04 (c) 2004 IEEE, pp. 2827-2834.*

M. Tarokh and P. Ferrari, "Case Study: Robotic Person Following Using Fuzzy Control and Image Segmentation", Journal of Robotic Systems 20(9) (c) 2003 Wiley Periodicals pp. 555-568.*

Lang, Kleinehagenbrock, Hoihenner, Fritsch, Fink & Sagerer, "Providing the Basis for Human-Robot-Interaction: A Multi-Modal Attention system for a Mobile Robot", ICMI '03, pp. 28-35, 2003.*

Japanese Office Action application No. 2003-097593 dated May 25, 2007.

* cited by examiner

GESTURE OF RAISING HAND
(FACE RECOGNITION → RECOGNIZE PERSON)

STANT FOLLOWING-UP

GESTURE OF STRETCHING OUT HAND
(VOICE)

STOP

APPARATUS, PROCESS, AND PROGRAM FOR CONTROLLING MOVABLE ROBOT CONTROL

FIELD OF THE INVENTION

The present invention relates to an apparatus, process, and a program for controlling a movable robot, which recognizes a subject to be followed by an image processing to follow up the subject. This application is based on Japanese Patent Application No. 2003-097593, and the content of which is incorporated by reference.

BACKGROUND ART

In conventional, as techniques in which a robot follows up a human, which is a subject to be followed, can be mentioned (1) "a movable robot which follows up a user", as disclosed in Japanese Patent Laid-Open No. 8-166822, (2) "a robot for following a wandering aged person" as disclosed in Japanese Patent Laid-Open No. 11-73582, and (3) "a control apparatus and a control process for a robot which is moved with legs as disclosed in Japanese Patent Laid-Open No. 2002-205290.

In the technique disclosed in the patent publication (1), "the movable robot which follows up a user" follows a source for an infrared light, put on the user, which is a subject to be followed.

In the technique disclosed in the patent publication (2), "the robot for following a wandering aged person" only follows a human to be followed up, and the robot cannot keep up with cases where the robot loses the sight of the subject to be followed up and where the walk speed of the subject is faster than that of the robot.

In the technique disclosed in the patent publication (3), if something is wrong with input data, which are inputted to the robot which is moved with legs via a sensor or such (in the case where a quantity of light from the light source exceeds a given value, in the case where the robot wants to confirm the face image of the person to be followed up, and the like), an improvement movement are performed for improving the input data (for example, blocking of the quantity of light from the light source over a hand, outputting a sound to turn the subject to be followed up towards the robot (speaking).

However, in the control of the movable robots (following-up robots) disclosed in the patent publications (1) and (2), there is a tendency to specially characterize the function for following up a person, which is the subject of following-up. In the control of the movable robot disclosed in the patent publication (3), no function for following up a person, which is the subject to be followed up, is provided. Specifically, in the conventional configurations, a problem occurs that while the robot can follow up a person, which is the subject to be followed up, the robot cannot make a sufficient communication with the person.

An object of the present invention is, therefore, to solve the problems associated with the conventional techniques and to provide an apparatus, process, and a program for controlling a movable robot, which can control the movable robot so that while the robot can make a sufficient communication with a person, which is the subject to be followed up, the robot can follow up the subject to be followed up, i.e., so that the robot can smoothly move with following up the subject.

SUMMARY OF THE INVENTION

The present invention has been made in order to attain the object described above and other objects. According to the present invention, there is provided an apparatus for controlling a movable robot comprising a camera, moving means, and a device for outputting a sound, which comprises: means for recognizing a subject to be followed up, which recognizes the subject on the basis of an image taken by the camera; means for controlling movement, which controls said moving means so as to keep the distance from said movable robot to the subject, having been recognized by said means for recognizing a distance to the subject, at a predetermined distance; and means for controlling the outputting of a sound, which outputs a sound or a voice related to the distance to the subject.

According to such a configuration, when the apparatus for controlling a movable robot is subjected to image processing an image taken by the camera through the means for recognizing a subject to be followed up to thereby recognize the subject. For example, a distance to the subject to be followed up is measured on the basis of parallax between images taken by two cameras, and the movement of the subject is detected from time series images whereby the distance and the position of the subject can be recognized. Subsequently, the means for controlling the movable robot recognizes a distance to a specific portion of the subject to be followed up by the means for recognizing a distance. For example, the specific portion of the subject may be the central portion of gravity of the subject.

Then, the moving means of the movable robot is controlled so that the distance to the central portion of gravity of the subject becomes a previously set distance. This allows the movable robot for following up the subject, while keeping a specific distance. At this time, the apparatus for controlling a movable robot outputs a situation of following-up as a sound by the means for controlling outputting of sound as occasion demands.

In the apparatus of the present invention, the moving means of the movable robot may move by two legs' walking.

According to this configuration, the moving means the movable robot having two legs is controlled by the means for controlling movement of the apparatus for controlling a movable robot so that the movable robot moves by two legs, whereby the apparatus for controlling a movable robot can actuate the movable robot as a human type robot.

In the apparatus of the present invention, the apparatus for controlling a movable robot may further comprise means for holding map information, which holds map information of an area within which said movable robot moves, and in this case, the means for controlling movement determines the actuation of said moving means based on the map information held in said means for holding map information.

According to such a configuration, the apparatus for controlling a movable robot determines the actuation of the moving means based on the map information held in said means for holding map information. For example, when areas that an obstacle exists are marked on the map information, the apparatus for controlling the movable robot can determine the actuation of the moving means so as to stop the robot in front of the obstacle.

In the apparatus of the present invention, a restricted area which prohibits approach may be set in the map information held in said means for holding map information.

According to this configuration, since the apparatus for controlling a movable robot can set a restricted area which prohibits approach of the movable robot, for example, in the case where the movable robot actuates on a stage, when areas except for the stage are assumed to the restricted area, the movable robot can be prevented from being dropped from the stage.

the subject to be followed up may be a person, and the apparatus may further comprise means for judging instruction from a person.

According to this configuration, the apparatus for controlling a movable robot can judge instruction from a person, for example, instruction of starting or stopping the following-up.

In the apparatus according to the present invention, the means for judging instruction from a person judges whether or not the robot follows up the person based on the results of recognition in which the person is recognized from the face image.

In the apparatus according to the present invention, the means for judging instruction from a person judges the instruction from the person based on at least one of posture, and gesture of said person.

According to this configuration, the apparatus for controlling a movable robot, which judges whether or not the robot follows up the person based on the recognition results in which the person has been recognized by an face image, can prohibit to receive instruction from or to make an actuation of following up a person, which has not been registered.

In the apparatus according to the present invention, the means for judging instruction from a person judges the instruction from the person based on a voice vocalized from said person.

According to this configuration, the apparatus for controlling a movable robot judges the instruction by posture or gesture of the person, who is the subject to be followed up, making it simple to make a communication between the movable robot and the person.

In the apparatus according to the present invention, the said means for controlling the outputting of a sound changes a volume of voice outputted to said device for outputting a sound, based on a circumferential noise level.

According to this configuration, for example, when a noise level around the circumference is high, the volume of the voice to be outputted can be enhanced to surely notify the voice outputted from the movable robot to the person, who is the subject to be followed up.

According to the present invention, there is a provided a process for controlling a movable robot comprising a camera, moving means, and a device for outputting a sound, which comprises:

a step for recognizing a subject to be followed up, which recognizes the subject on the basis of an image taken by the camera;

a step for recognizing a distance to the subject having been recognized by the step for recognizing a subject to be followed up;

a step for controlling movement, which controls said moving means so as to keep the distance to the subject having been recognized by said step for recognizing a distance to the subject at a predetermined distance; and a step for controlling the outputting of a sound, which outputs a sound or a voice related to the distance to the subject.

According to such steps, in the process for controlling a movable robot, a subject to be followed is recognized in the step for recognizing a subject to be followed up by image-processing the image or images taken by a camera. For example, based on a parallax between images taken by two cameras, the movement of the subject to be followed up is detected by the distance to the subject, whereby the distance and the position of the subject can be recognized. In addition, in the process for controlling a movable robot, the distance to a specific portion of the subject is recognized in the distance recognition step. For example, the central portion of the gravity of the subject may be determined as the specific portion, Then, in the process for controlling a movable robot, the moving means of the movable robot is controlled by the movement control so as to set the distance to the specific portion of the subject to be followed to a predetermined distance, whereby the movable robot can follow up the subject while maintaining a prescribed interval. Furthermore, in the process for controlling a movable robot, the following-up situation is outputted as a sound as occasion may demand in the step for controlling the outputting of a sound.

According to the present invention, there is provided a program for controlling a movable robot comprising a camera, moving means, and a device for outputting a sound: which comprises having a computer to serves as means for recognizing a subject to be followed up, which recognizes the subject on the basis of an image taken by the camera; means for recognizing a distance to the subject having been recognized by the means for recognizing a subject to be followed up; means for controlling movement, which controls said moving means so as to keep the distance to the subject having been recognized by said means for recognizing a distance to the subject at a predetermined distance; and means for controlling the outputting of a sound, which outputs a sound or a voice related to the distance to the subject.

According to such steps, in the program for controlling a movable robot, a subject to be followed is recognized by the means for recognizing a subject to be followed up by image-processing the image or images taken by a camera. Then, in the program for controlling a movable robot recognizes a distance to a specific portion of the subject to be followed up by the means for recognizing a subject to be followed up. For example, the central portion of the gravity of the subject may be determined as the specific portion, Then, in the program for controlling a movable robot, the moving means of the movable robot is controlled by the movement control so as to set the distance to the specific portion of the subject to be followed to a predetermined distance, whereby the movable robot can follow up the subject while maintaining a prescribed interval. Furthermore, in the program for controlling a movable robot, the following-up situation is outputted as a sound as occasion may demand by the means for controlling the outputting of a sound.

DESCRIPTION OF PREFERRED EMBODIMENTS

Embodiments of the present invention will now be described.

(Constitution of Movable Robot)

Figure 1:
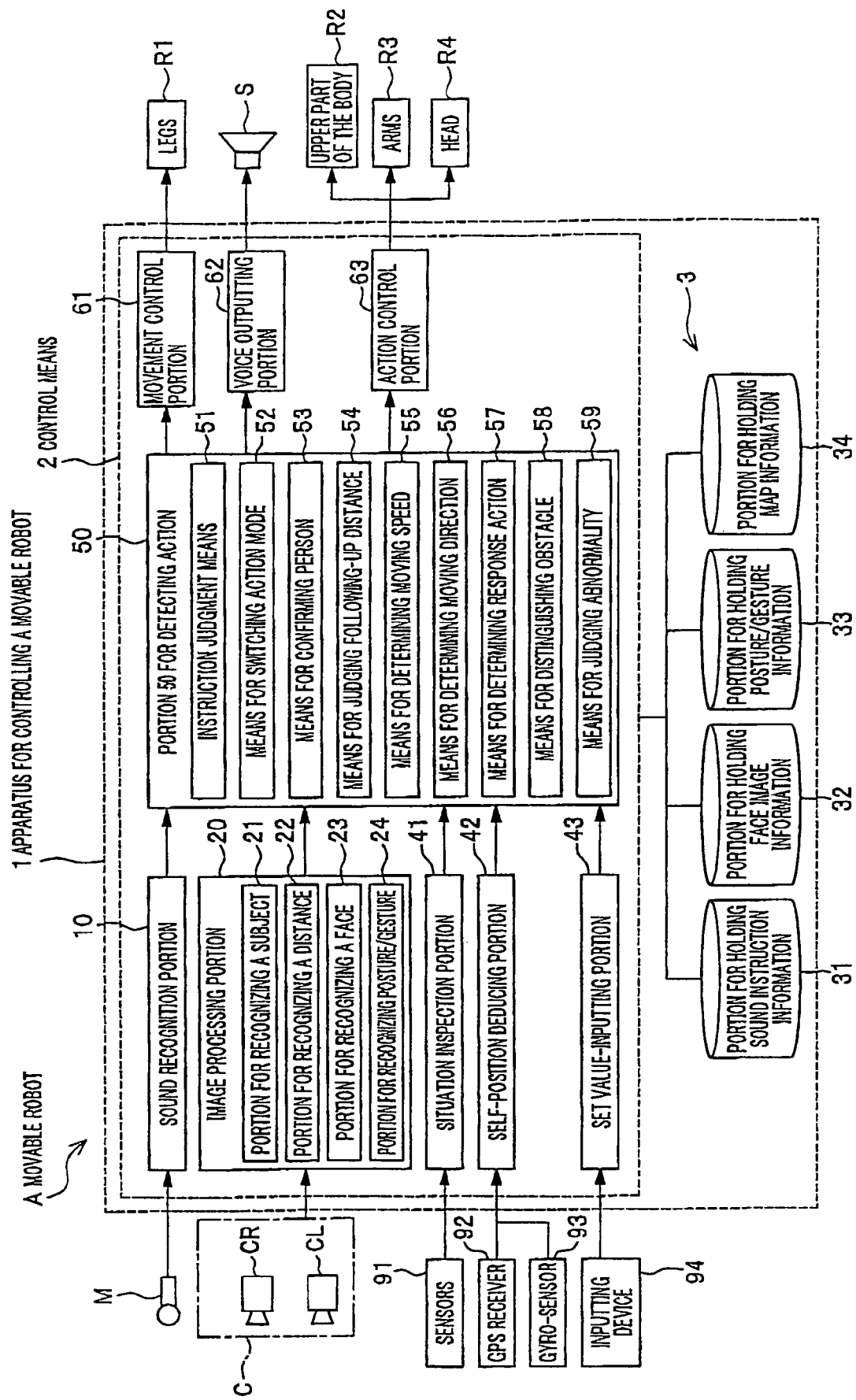
FIG. 1 is a block diagram showing a configuration of a movable robot having an apparatus for controlling a movable robot according to one embodiment of the present invention accommodated therein.

FIG. 1 is a block diagram showing a configuration of a movable robot A having an apparatus 1 for controlling a movable robot according to one embodiment of the present invention accommodated therein. As shown in FIG. 1, a movable robot A comprises an apparatus 1 for controlling the movable robot A, which controls the behavior of the movable robot A. an inputting means, which inputs various information (data) to the apparatus 1 for controlling a movable robot, and actuating means, which makes an actuation based on the information outputted from the apparatus 1 for controlling a movable robot.

The movable robot A possesses a microphone M. cameras C (CR, CL), sensors 91, GPS (Global Positioning System) receiver 92, gyro-sensor 93, and an inputting device 94 as the inputting means. Also the movable robot A possesses as the actuation means, a speaker S, legs R1, an upper part R2 of the body, arms R3 and a head R4.

The microphone M input external sound signals, and here inputs instruction of a voice or sound from a person. The sound signal inputted here is inputted to sound recognition means 10 possessed by the apparatus 1 for controlling a movable robot.

The cameras C each take an image of a subject to be followed up in order to recognize the subject such as person, and for example, are CCD (Charge-Coupled Device) cameras. In this embodiment cameras C comprises two cameras, i.e., a right side camera CR and a left side camera CL, in order to obtain a parallax. Images taken by these cameras are inputted to an image processing portion 20 of the movable robot A. It is noted that the cameras C correspond to left and right eyes of the movable robot A, and they are provided on the head R4 such that they mutually have a prescribed interval and are directed towards the same direction (so as to be parallel optical axes thereof).

The sensors 91 determine a situation of the movable robot A. For example, the sensors 91 include: a sensor for detecting a residual quantity of battery for actuation of the robot A, a thermosensor for detecting the temperature within the robot A, and other sensors. Various information detected herein is periodically read out by a situation inspection portion 41 of the apparatus 1 for controlling a movable robot.

The GPS receiver 92 receives an electric wave sent from a GPS satellite, whereby latitudes, which are positional information, can be acquired.

The gyro-sensor 93 detects the moving direction, and distance of the movable robot A and the like. This makes it possible to deduce the present location of the movable robot A, even if no electric wave can be received from the GPS satellite. The information detected by the GPS receiver 92 and the gyro-sensor 93 is referred by a self-position deducing portion 42 of the apparatus 1 for controlling a robot.

An inputting device 94 inputs various set values for the movable robot A. The set values include, for example, a distance between the movable robot A and the person to be followed up when the movable robot A follows up the subjective person (following-up distance), and a distance for stopping the movable robot A when the following-up distance is contracted (distance for stopping). The set values inputted here are inputted to a set value-inputting portion 43 of the apparatus 1 for controlling a robot.

The speaker S outputs voices (sounds) outputted from a voice outputting portion the apparatus 1 for controlling a robot out of the movable robot A. The speaker S is used for notifying the situation to the person to be followed up by a sound.

The movable robot A is assumed to be a humanoid robot and the leg portions R1, the upper part R2 of the body, the arms R3 and the head R4 correspond to the human body, respectively.

The leg portions R1 corresponding to the moving means in the attached claims, and move the movable robot A in a specified direction. The leg portions R1 possess joints (not shown) corresponding to a human crotch, human feet, and human knees, and make it possible to walk with two legs based on instruction from a movement control portion 61 of the apparatus 1 for controlling a movable robot.

The upper part R2 of the body possesses the sensors 91, a battery (not shown) and the like. The arms R3 possess joints (not shown) corresponding to human shoulders, elbows, and wrists, and actuate on the basis of instruction from the action control portion 63 of the apparatus 1 for controlling a movable robot.

The head R4 has a neck joint (not shown) for changing a tilting angle, and a neck joint (not shown) for changing pan, and actuates on the basis of instruction from the action control portion 63 of the apparatus 1 for controlling a movable robot. The cameras C is provided on the head R4, and directions of the cameras are specified by the tilting angle and the pan.

(Configuration of Movable Robot)

Referring to FIG. 1, the detailed configuration of the apparatus 1 for controlling a movable robot will further be described. The apparatus 1 for controlling a movable robot is built in the body of the movable robot A and controls the actuation of the robot A. The functions of the elements within the apparatus 1 for controlling a movable robot are realized by the CPU (not shown), which make a calculation based on the programs and data stored in a storage device (not shown).

As shown in FIG. 1, the apparatus 1 for controlling a movable robot possesses control means 2 mainly comprising the sound recognition portion 10, the image processing portion 20, a situation inspection portion 41, the self-position deducing portion 42, the set value-inputting portion 43, and holding means (memory means) comprising a portion 50 for detecting an action, the movement control portion 61, a voice outputting portion 62, and an action control portion 63, a portion 31 for holding sound instruction information, a portion 32 for holding face image information, a portion 33 for holding posture/gesture information, and a portion 34 for holding map information.

Referring to previously set vocabulary (instruction language) previously held (registered) in the portion 31 for holding sound instruction information, the sound recognition portion 10 recognizes a sound or voice signal inputted from the microphone M to thereby recognize command or intent of the person. The instruction language includes, for example, the command "stop", which stops the following-up the person, and the like. The information concerning the instruction (command) corresponding to the instruction language is notified to instruction judgment means 51 of the portion 50 for detecting an action.

The sound recognition portion 10 may possess a portion of detecting a noise level (not shown) so that a level of a stationary volume is detected as a noise level. In this case, the noise level having been detected is notified to means 57 for determining a response action, at which the volume to be outputted is controlled.

The image processing portion 20 makes image-processing of images taken by the cameras C to recognize the person to be followed up (subject), to recognize a posture or gesture of the person. In this embodiment, the image-processing portion 20 is composed of a portion 21 for recognizing a subject to be followed up, a portion 22 for recognizing a distance, a portion 23 for recognizing a face, and a portion 24 for recognizing a posture and a gesture.

The portion (means) 21 for recognizing a subject to be followed up recognizes a person to be followed up. In the portion 21 for recognizing a subject to be followed up, the person to be followed up is recognized by extracting a contour of the face of the person to be followed up from the images having been taken in the following manner.

First, based on a parallax of the left and right image simultaneously taken by left and right cameras CL and CR, respectively, distance images in which a size (amount) of the parallax in the images in which the parallax is detected is embedded in each pixel are produced. On the other hand, taking one of the cameras (for example the camera CR) as a standard, images at different time are inputted, and difference images are produced by extracting moving areas through the differences in the image among the images taken. In the differential images, for example, a pixel in a moving area is assumed to be "1" and a pixel in a non-moving are is assumed to be "0".

From the distance images and the differential images, the parallax having the largest moving amount (distance) is specified, and the specified distance is considered to the distance to the subject, in which the person exists. Giving a several width (for example several ten cm) the distance to the subject, the pixel corresponding to the distance is extracted from the distance images to produce a distance image from the subject. A contour is extracted by taking as the subject area the areas in which the pixel exists in the distance image from the subject produced by the pixels corresponding to the distance to the subject. In the contour extraction, SNAKES (dynamic contour model) may be used.

The portion (means) 22 for recognizing a distance recognizes (measures) the distance from the focus position of the cameras C to the person which is the subject to be followed up. Here, since the contour of the person has been extracted in the portion 21 for recognizing a subject to be followed up, gravity center position within the contour is assumed to be the position of the subject to be measured. Also, since the distance image in which size (amount) of the parallax is embedded in each pixel as the distance information has been produced in the portion 21 for recognizing a subject to be followed up, the parallax at the gravity center position can be obtained in this distance image.

When the parallax is to be Z, the distance D from the camera C corresponding to the parallax Z to the gravity center position of the person can be calculated by the following equation (1), wherein the focus distance of the camera C is f, and the distance between the right and left cameras CR and CF is B.

$$D = B \times f / Z \tag{1}$$

The number of the cameras is not restricted two, and the distance may be measured utilizing three or more cameras in the present invention. For example, when nine cameras comprising three rows by three columns are used, and when the camera positioned at the center is taken as the standard camera, the distance to the person can be precisely measured based on the parallaxes to other cameras.

The portion 23 for recognizing a face recognizes the face of the person, which is the subject matter to be followed up, based on the image taken by the cameras C. For example, the areas of skin tone area extracted from color images taken by the cameras C, and recognizes the face area as the area covering the skin tone area corresponding to the head of the person area recognized by the portion 21 for recognizing a subject to be followed up. Subsequently, whether or not person recognized in the portion 23 for recognizing a face corresponds to the person previously held (registered) in a portion 32 for holding face information. For example, by pattern matching between the image in the face area and the face image held in the portion 32 for holding face information or by matching the images based on the face image information, which characterizes the face image (distance between characteristic points or such), the person is confirmed.

The portion 24 for recognizing a posture and a gesture recognizes the instruction of the person, which is the subject to be followed up, by referring a posture defined by a relative position of the person area held (registered) in a portion 33 for holding posture and gesture information and a hand area, and to action (gesture) defined by time-serial change in the posture.

The portion 24 for recognizing a posture and a gesture extracts the skin tone area from color images taken by the cameras C, searches the area, which is a candidate for the person among the face area recognized in the portion 21 for recognizing a subject to be followed up, and recognizes the posture of the person based on the relative position between the person area and the hand area. The portion 24 for recognizing a posture and a gesture recognizes the gesture of the person by specifying the relative position between the person area and the hand area from color images taken by the camera C, which are time-serially inputted, within a predetermined time interval.

The situation inspection portion 41 detects the internal situation of the movable robot A. The a situation inspection portion 41 reads information detected by the sensors 91, for example, the internal situations such as an mount of the residual battery, and a temperature, at a constant interval, and notifies the information to means 59 for judging abnormality of the portion 50 for detecting an action.

The self-position deducing portion 42 deduces the self-position (position of the movable robot A) and the direction to be moved based on the information detected from the GPS receiver 92 and the gyro-sensor 93. For example, if the movable robot A moves and follows up a person indoor, the self-position is deduced by the indoor map data previously held (registered) in a portion 34 for holding map information and the moving direction and moving distance detected by the gyro-sensor 93, and the like.

The set value-inputting portion 43 inputs various set values from the inputting device 94, and memorizes the set values in a memory (not shown) or such. The set value set herein is referred by each of means in the set value-inputting portion 43 of the portion 50 for detecting an action.

The portion 50 for detecting an action detects the action of the movable robot A based on the information recognized by the sound recognition portion 10 and the image processing portion 20, the internal situation of the movable robot A detected by the situation inspection portion 41, the self-position deduced by the self-position deducing portion 42 and the various set values inputted by the set value-inputting portion 43.

In this embodiment, the portion 50 for detecting an action is composed of means 51 for distinguishing instruction, means 52 for switching action mode, means 53 for confirming a person, means 54 for judging a following-up distance, means 55 for determining a moving speed, means 56 for determining a moving direction, means 57 for determining response action, means 58 for distinguishing an obstacle, and means 59 for judging abnormality.

The means 51 for distinguishing instruction distinguishes instruction from the person to be followed up based on instruction (command) information corresponding to instruction language vocalized by the person, which is recognized by the sound recognition portion 10, the posture or gesture recognized by the portion 24 for recognizing a posture and a gesture.

For example, when the instruction language recognized by the sound recognition portion 10 is "stop", the means 51 for distinguishing instruction notifies the instruction that the movable robot A stops (stop instruction) to the means 52 for switching action mode and the means 57 for determining response action. For example, if the gesture of the person recognized by the portion 24 for recognizing a posture and a gesture is the action of "raising hand", the means 51 for distinguishing instruction notifies the instruction the instruction that the robot A follows up the person (following-up instruction) to the means 52 for switching action mode and the means 57 for determining response action. Also, if the gesture of the person recognized by the portion 24 for recognizing a posture and a gesture is the action of stretching out the hand, the means 51 for distinguishing instruction notifies the instruction that the movable robot A stops (stop instruction) to the means 52 for switching action mode and the means 57 for determining response action.

The means 52 for switching action mode switches the action mode exhibiting the action situation of the movable robot A. The action mode is memorized in a memory (not shown). For example, the action mode in the situation where the movable robot A follows up the person is in a following-up mode, and the action mode in the situation where the robot stops the following-up and waits the next instruction is in a waiting mode. The action modes are switched based on the content of the instruction (following-up instruction, stop instruction) notified from the means 51 for distinguishing instruction.

The means 53 for confirming a person confirms whether or not the person recognized by the face recognition portion 23 of the image processing portion 20 is the person who is permitted to operate the movable robot A (the person, which is the subject to be followed up). Flag or such is previously memorized in the portion 32 for holding face image information, and the person is confirmed by the flag.

The means 54 for judging a following-up distance judges whether or not the distance for following up to the person is appropriate based on the distance from the cameras C to the person to be followed up recognized (measured) in the portion 22 for recognizing a distance of the image processing portion 20. In this embodiment, the distance between the movable robot A and the person to be followed up (the following up interval) at the time when the movable robot A follows up the person is determined as 1.4 m, and the means 54 for judging a following-up distance judges whether or not the following up interval is far from 1.4 and whether or not the following up interval is too close.

When the walking speed of the person becomes slow and when the movable robot A approaches to the distance between the movable robot A and the person of 0.9 m (when the distance becomes a stopping distance) or when the movable robot A looses the person to be followed up (failing to the recognition of the person), the means 54 for judging a following-up distance notifies the instruction that the following up should be stopped to the means 55 for determining a moving speed.

The means 55 for determining a moving speed determines the moving speed of the movable robot A based in the judgment of the means 54 for judging a following-up distance. For example, if the means 54 for judging a following-up distance judges that the following up interval is prescribed distance far from 1.4 m, the means 55 for determining a moving speed determines the moving speed to be accelerated, and if the means 54 for judging a following-up distance judges that the following up interval is prescribed distance closing 1.4 m, it determines the moving speed be decelerated. If the instruction that the following up should be stopped is notified from the means 54 for judging a following-up distance, the means 55 for determining a moving speed determines that the moving speed is zero.

The means 56 for determining a moving direction determines the direction for following up the person, which is the subject to be followed up. The means 56 for determining a moving direction measures the amount of the gap of the gravity center position which is standard for the distance to the person recognized by the portion 22 for recognizing a distance of the image processing portion 20 from the center of the gravity center of image taken by the cameras C in the horizontal direction, and determines the moving direction so that the gravity center position is positioned to the center in the horizontal direction. For example, if the gravity center position has a gap in the right direction relative to the center position, the moving direction is determined to move towards the right direction. The angle of the moving direction is calculated based on the distance from the cameras C to the person and an amount of the gap between the gravity center position in the image taken and the horizontal position.

The means 57 for determining response action determines the action acted at the time when the movable robot A follows up the person to be followed up. For example, in the case where even if the movable robot A walk with the maximum stride by the legs portions R1, the following up interval to the person does not become 1.4 m. the means 57 for determining response action instructs to a voice outputting portion 62 so as to vocalize "please wait" by the speaker S. Also, when the movable robot A is closing the person to 0.9 m, the means 57 for determining response action instructs to the voice outputting portion 62 so as to vocalize "I will stop" by the speaker S.

When the situation where the following-up interval is 1.4 is kept for a prescribed period, the means 57 for determining response action may instruct to the voice outputting portion 62 so as to vocalize "I am walking four step after you" by the speaker S. By outputting such a sound, the situation where the movable robot A continues the following up is notified to the person. This eliminates the person's confirmation of the following up by turning back.

Furthermore, when the noise level is notified from the sound recognition portion 10, the means 57 for determining response action notifies a volume level based on the noise level to the voice outputting portion 62.

The means 58 for distinguishing an obstacle judges whether or not the movable robot A can follow up the person to be followed up based on an area where obstacles exist or a restricted area which prohibits approach is set in the map information previously held (registered) in the portion 34 for holding map information. If it is judged that the movable robot A cannot follow up the person, the means 58 for distinguishing an obstacle notifies this fact to the means 57 for determining response action. Then, the means 57 for determining response action stop the following-up and, at the same time, may instruct the voice outputting portion 62 to vocalize "I cannot go ahead anymore".

The means 59 for judging abnormality judges the abnormality of the movable robot A based on the residual amount of the battery, temperature and the like detected by the situation inspection portion 41. For example, when the residual battery becomes small, or when the temperature is increased to a prescribed temperature or more, the means 59 for judging abnormality judges that the movable robot A is in an abnormal state, and notifies this fact to the means 57 for determining response action. The means 57 for determining response action then stops the following up to the person, The movement control portion 61 controls the actuation of the leg portions R1 (two legs) of the movable robot A based on the moving speed and the moving direction determined in the portion 50 for detecting an action. Specifically, stride (pitch) of two legs and the walking speed (number of sliding the legs), the rotation direction are adjusted, whereby the movable robot A can follow up the person while keeping the predetermined distance (for example 1.4 m).

The portion 50 for detecting an action and the movement control portion 61 correspond to the movement control portion in the appended claims.

The voice outputting portion 62 outputs preset sound (or voice) (response message recorded on a sound recording portion (not shown)). The response message to be outputted is determined by response message number notified from the means 57 for determining response action or such. The voice outputting portion 62 adjust an output volume of the speaker S, when the volume level is notified from the means 57 for determining response action.

The means 57 for determining response action and the voice outputting portion 62 correspond to the means for controlling the outputting of sound in the appended claims.

The action control portion 63 actuates the upper body R2, arms R3 and the head R4 so as to make the movable robot A to perform a preset action (response action recorded on a response action recording portion (not shown)) based on the action determined in the portion 50 for detecting an action. For example, when the movable robot A looses the person to be followed up, the action control portion 63 actuates the movable robot A to perform an action "give up where both arms R3 are holding up, or an action shaking the head R4 or such.

The portion 31 for holding sound instruction information holds the instruction language instructed by the person to be followed up as voice information and instruction (command) information thereof. For example, when "stop" is held as a voice, the instruction information which indicates that this voice has the content of the instruction to stop the movable robot A is also held.

The portion 32 for holding face image information holds a face image of the person to be followed up, and face image information related to the face image. The face image information includes characteristic points of the person's face (outer comer of the eye, tip of the nose, top of the nose, lips and the like).

The portion 33 for holding posture/gesture information associates the posture of the person and a prescribed series of actions of the person with moving action of the movable robot A. For example, when the person makes a gesture "raising a hand", the action of the moving robot A is associated with "start following-up, and when the person makes a gesture" stretching out the hand", the action of the moving robot A is associated with "stop" (stop following-up).

The portion (means) 34 for holding map information holds map data (map information) where the movable robot A moves. In the map data, an area where obstacles exist and a restricted area which prohibits approach are depicted.

(Control and Operation of Movable Robot)

Figure 2:
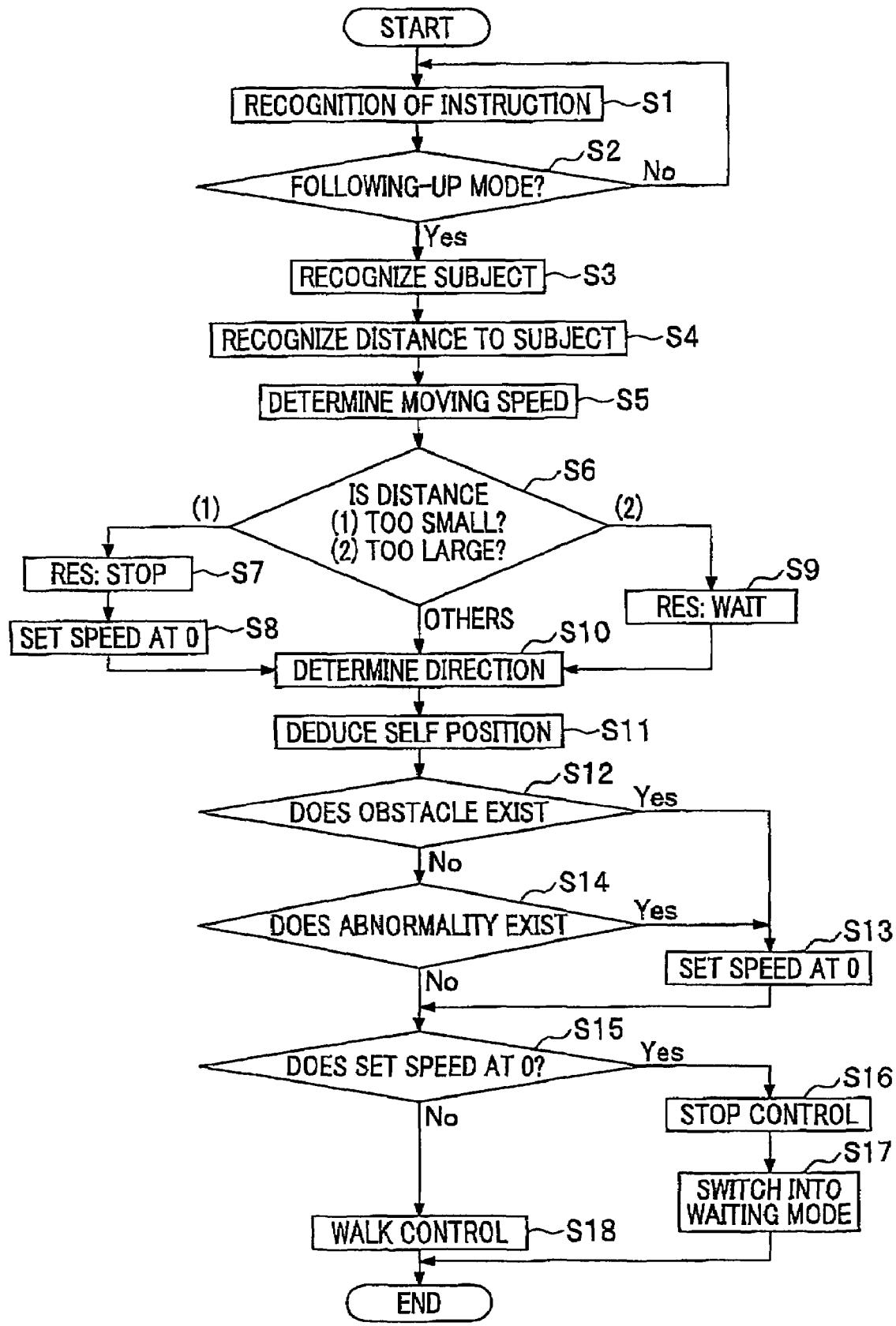
FIG. 2 is a flowchart showing treatments of the apparatus for controlling a movable robot.
Figure 3:
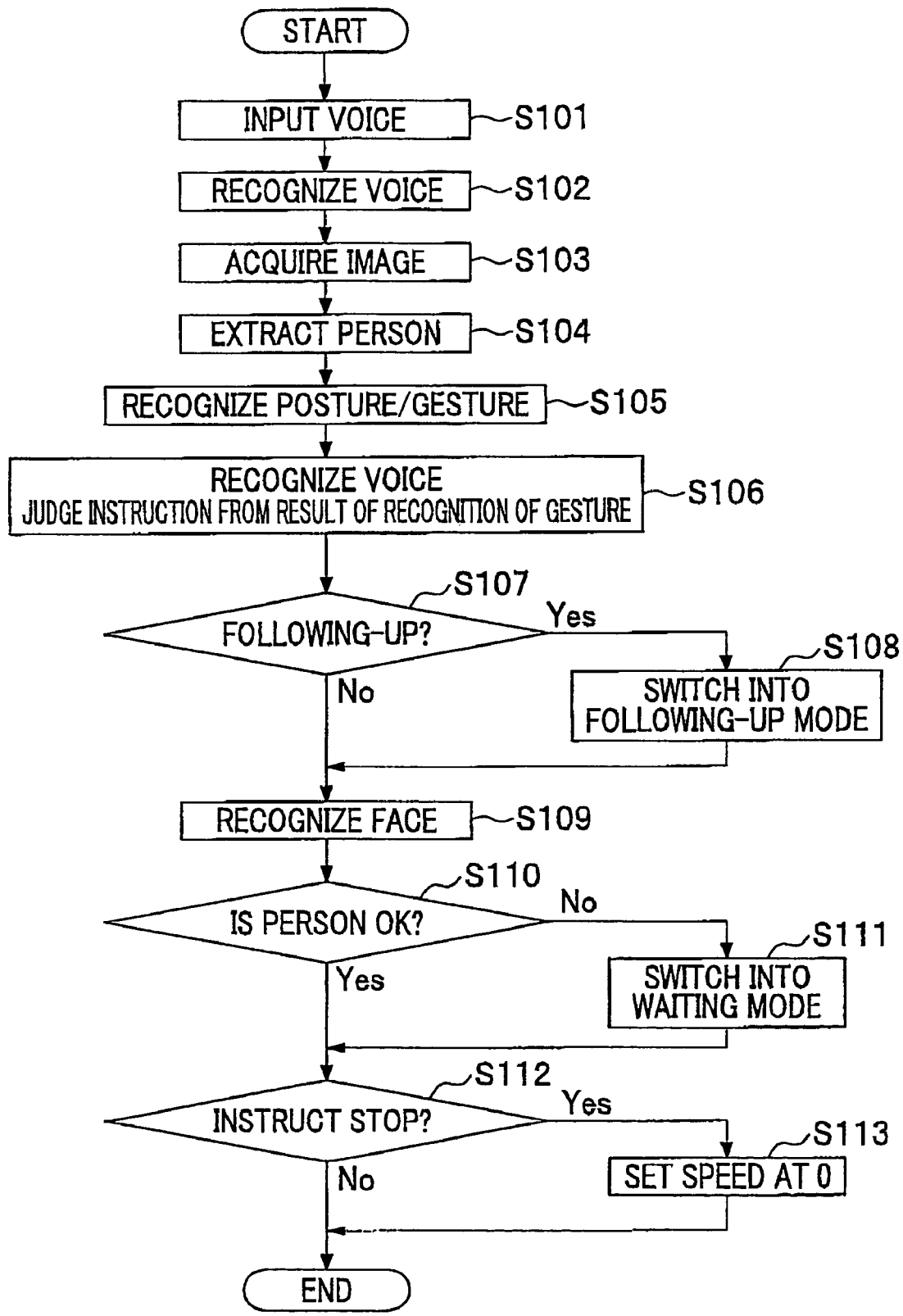
FIG. 3 is a flowchart showing details of the treatment for recognizing instruction of the apparatus for controlling a movable robot.

Referring to FIG. 2 and FIG. 3 (and FIG. 1 as occasion may demand), the operation of the apparatus 1 for controlling a movable robot according to an embodiment. FIG. 2 is a flowchart showing treatments of the apparatus for controlling a movable robot, and FIG. 3 is a flowchart showing details of the treatment for recognizing instruction of FIG. 1.

First, the apparatus 1 for controlling a movable robot recognizes instruction by a voice and instruction by a posture or gesture instructed by the subject to be followed up by the sound recognition portion 10, the image processing portion 20, and when satisfying prescribed conditions, switches the action mode into a following-up mode by means for switching the action mode (Step S1). The detail of the recognition of the instruction will be described later on.

Then, as for the results of the recognition of instruction, the apparatus 1 for controlling a movable robot judges whether or not the action mode is in the following-up mode (Step S2). If the action mode is not in the following-up mode (Step S2: No), the step is returned to Step S1, and the apparatus 1 for controlling a movable robot waits until the mode is switched to the following-up mode (waiting mode) Conversely, if the mode is the following-up mode (Step S2: Yes), the step advances to the next following-up processing.

In the following-up processing, the subject to be followed up is recognized by extracting a moving subject from the image taken by the cameras C, performed in recognition of instruction, which will be described later on (Step S3).

Then, the portion 22 for recognizing a distance calculates the gravity center of the person in the image, and recognizes the distance from the movable robot A (cameras C) to the calculated gravity center, i.e., the distance to the person to be followed up by a stereo calculation or by referring to the distance image calculated in the processing of recognition of the instruction (Step S4).

Next, the means 55 for determining a moving speed determines the moving speed of the movable robot A based on the distance to the person to be followed up (Step S5). Specifically, the moving speed is determined so that if the distance to the person to be followed up is a prescribed value larger than 1.4 m, the moving speed is increased, conversely, if it is a prescribed value smaller than 1.4 m, the moving speed is decreased, and if it is approximately 1.4 m, the moving speed is maintained.

Next, if the distance to the person to be followed up is too large or too small, the movable robot A outputs a voice to the person. For example, if it is smaller than (Step S6, (1)), means 57 for determining a response action decides to output a voice "I will stop.", and responding to this, the voice outputting portion 62 outputs a voice signal to the speaker S, whereby the movable robot A vocalizes "I will stop." (Step S7). For stopping, the moving speed is reset to "zero" (Step S8), and the step is shifted to a decision processing of the moving direction (Step S9). On the other hand, if the distance is too large, for example, if the distance is larger than 5 m (Step S6, (2)), means 57 for determining a response action decides to output a voice "please wait", and responding to this, the voice outputting portion 62 outputs a voice signal to the speaker S, whereby the movable robot A vocalizes "please wait." (Step S9) and the step is shifted to a decision processing of the moving direction (Step S10). In the response the upper body R2, arms R3, head R4 and the like are actuated by the action control portion 63, the response may be made with a gesture.

A noise level inputted from the microphone M is detected in the sound recognition portion 10, and the means 57 for determining detecting a response action determines the volume of the voice (utterance) to meet the noise level so that voice outputting portion 62 outputs the voice signal at this volume by the speaker S.

Furthermore, if the distance is not too small and not too large (Step S6, Others), specifically if it is not smaller than 0.9 m and not larger than 5 m, the step is shifted to the decision processing of the moving direction (Step S10).

In the decision processing of the moving direction (Step S10), the moving direction is decided to meet the moving direction of the person to be followed up. For example, in the case where the person to be followed up is shifted to the right side relative to the center of the horizontal direction of the frame in the image taken by the cameras C, the person to be followed up walks in the right direction relative to the advance direction of the movable robot A and, thus, the moving direction is decided to a right side to the present moving direction.

Next, the self-position deducing portion 42 deduces the self-position of the movable robot A by referring to signals from the GPS receiver 92 and the gyro-sensor 93 and the map information from the portion 34 for holding map information (Step S11).

Then, the means 58 for distinguishing an obstacle recognizes an obstacle around the movable robot A from the self-position deduced by the self-position deducing portion 42, and the map information around the movable robot A, and distinguishes whether or not an obstacle exists around the movable robot A (Step S12). If an obstacle exists (Step S12; Yes), the moving speed is set at 0 (Step S13), and then the step is shifted to moving control (Steps S15 to S18). If no obstacle exists (Step S12: No), the means 59 for judging abnormality judges whether or not abnormality for obstructing the moving action exists (Step S14). The abnormality intended herein includes low residual battery, too high temperature and the like, these situations are judged from the detected values detected by the sensors 91 received from the situation inspection portion 41. If any abnormality exists (Step S14; Yes), the moving speed is set at 0 (Step S13), and then the step is shifted to moving control (Steps S15 to S18). If no abnormality exists (Step S14: No), the set moving speed is maintained and the step is shifted to moving control (Steps S15 to S18).

In the moving control (Steps S15 to S18), the signals for the moving speed and the moving direction set by the portion 50 for detecting an action are received by the movement control portion 61. If the set moving speed is 0 (Step S15: Yes), the leg portions R1 are actuated so as to control the movable robot to be stopped (Step S16). Then, the action mode is switched to the waiting mode (Step S17), the process is ended.

If the set moving speed is not 0 (Step S15: No), the leg portions R1 are actuated so as to control the movable robot to walk at the moving speed in the moving direction having been set (Step S18), and then process is ended.

After the process has been ended, the process is repeated again from Step S1.

Next, referring to FIG. 2 (and FIG. 1 as occasion may demand), the recognition of instruction will be described in greater detail.

First, in the sound recognition portion 10, a voice is inputted from the microphone M (Step S101), the language (reservation language) is recognized from the voice (Step S102).

On the other hand, the image processing portion 20 acquires the images taken by the cameras C (Step S103), and the moving subject (person) is extracted to the image (Step S104).

The extraction of the moving subject is performed as follows. First, based on parallax between right and left cameras CR and CL taken at the same time, distance image in which a size (amount) of the parallax is embedded in each pixel as information for distance is produced. Also, taking one of the cameras as a standard (for example CR), images each having a different time are inputted, and a differential image in which area having a moving subject is extracted from the image taken by the difference. Then, the parallax (distance) having the largest moving amount is specified from the distance image and the differential image, and the specified distance is assumed as the distance to the subject where the person exists. Furthermore, an image of distance to the subject in which pixels corresponding to a prescribed distance before and after the distance to the subject are extracted from the distance image is produced. The moving subject is extracted from the image of distance to the subject taking an area in which pixel exist as the subject area utilizing SNAKES by extracting the contour.

After the extraction of the moving subject, the portion 24 for recognizing a posture and a gesture recognizes posture or gesture of the person, which is the moving subject (Step S105). The recognition of the posture or gesture is performed by recognizing the positions of the face and hand from a skin tone areas within the moving subject in the image, comparing the positional relationship between the face and the hand with the posture and gesture registered in the portion 33 for holding posture/gesture information to recognize the posture or gesture.

Then, the instruction judgment means 51 judges the contents of the instruction from the person by referring the portion 31 for holding sound instruction information or the portion 33 for holding posture/gesture information based on the language recognized by the sound recognition portion or the posture or gesture recognized by the portion 24 for recognizing a posture and a gesture (Step S106).

If the content of the instruction judged is the following-up instruction (Step S107; Yes), the means 52 for switching action mode switches the mode into the following-up mode (Step S108). If the content of the instruction judged is not the following-up instruction (Step S107; No), the step is shifted to the following step without switching the mode.

Then, the face recognition portion 24 refers the portion 32 for holding face image information to recognize the person (Step S109), and the means 53 for confirming a person confirms whether or not the person is the one that the movable robot A may follow the instruction (adequate instructor) (Step S110) As the result, if the person is not an adequate instructor (Step S110; No), the means 52 for switching action mode switches the action mode into the waiting mode (Step S111). If the person is an adequate instructor (Step S110; Yes), the step is shifted to the following step without switching the mode.

Next, it is judged whether or not the content of the instruction is stopping instruction (Step S112). If the content of the instruction is stopping instruction (Step S112; Yes), the moving speed is set at 0. If the content of the instruction is not stopping instruction (Step S112; No), the step is shifted to the following step (Step 2 in FIG. 1) as it is.

(Typical Example of Gesture)

Referring to FIG. 4, a typical example of the gesture will be described.

Figure 4A:
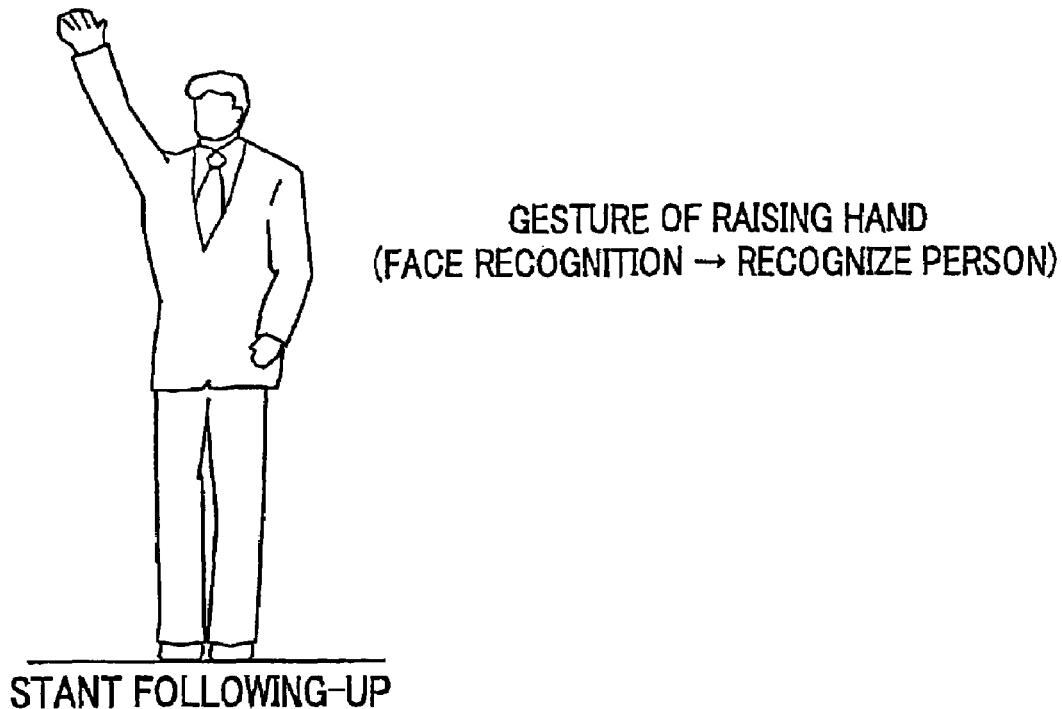
FIG. 4 is a drawing showing a gesture an outline of a person, which is a subject to be followed up.

FIG. 4 is a drawing showing a gesture an outline of a person, which is a subject to be followed up. FIG. 4A shows that the person to be followed up makes a gesture "raising hand". By this gesture, the portion 24 for recognizing a posture and a gesture and the instruction judgment means 51 judge to start the following up following-up instruction), and the person is identified (specified) by the face recognition portion 24 and the instruction judgment means 51.

Figure 4B:
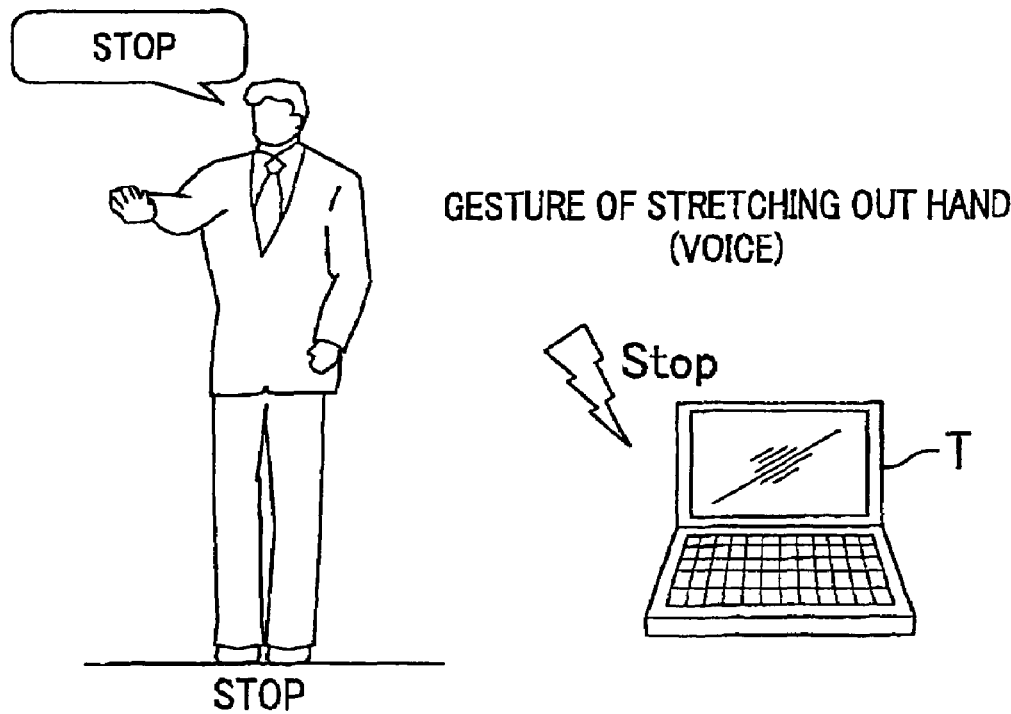

FIG. 4B shows the situation where the person to be followed up vocalizes "stop", and makes a gesture "stretching out the hand". By this gesture, the portion 24 for recognizing a posture and a gesture and the instruction judgment means 51 judge the completion of the following-up (stopping instruction), and also the sound recognition portion 10 and the instruction judgment means 51 judge that the movable robot completes the following-up. Also, the instruction judgment means 51 may judge the completion of the following-up when it receives stopping instruction (Stop) from an external local control terminal T via a wireless signal.

When the gesture and voice are inconsistent with each other, for example, in the case where the instruction for starting the following-up is made by the gesture (following-up instruction), while the instruction for stopping the action of the following-up is made by the voice (stopping instruction), the action of the following-up is stopped considering a safety.

(Typical Example of Following-up Action of Movable Robot)

Now, a typical example of the following-up action of the movable robot will be described by referring to FIG. 5.

Figure 5A:
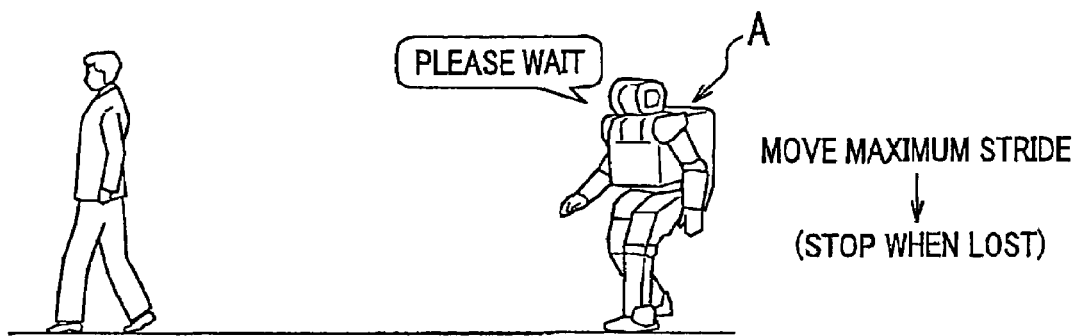
FIG. 5 is a drawing showing a positional relationship between the person, which is a subject to be followed up, and the movable robot in the following-up movement.

FIG. 5 is a drawing showing a positional relationship between the person, which is a subject to be followed up, and the movable robot in the following-up movement. FIG. 5A shows the situation where the distance between the person to be followed up and the movable robot A is longer than the following-up distance (1.4 m) and the person to be followed up walks at a walking speed faster than the maximum moving speed of the movable robot A. In this case, the means 57 for determining response action judges that the movable robot A cannot catch up with the person to be followed up, and the voice outputting portion 62 vocalizes "please wait" via the speaker S. If the movable robot A looses the person to be followed up, the following-up is stopped.

Figure 5B:
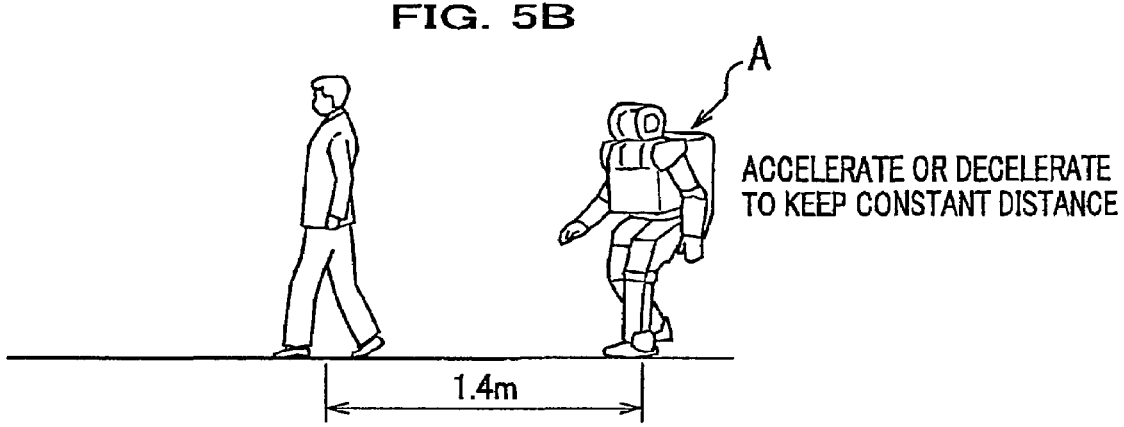

FIG. 5B shows the situation where the movable robot A follows up the person to be followed up while maintaining a prescribed distance (following-up interval: 1.4 m) between the person to be followed up and the movable robot A.

Figure 5C:
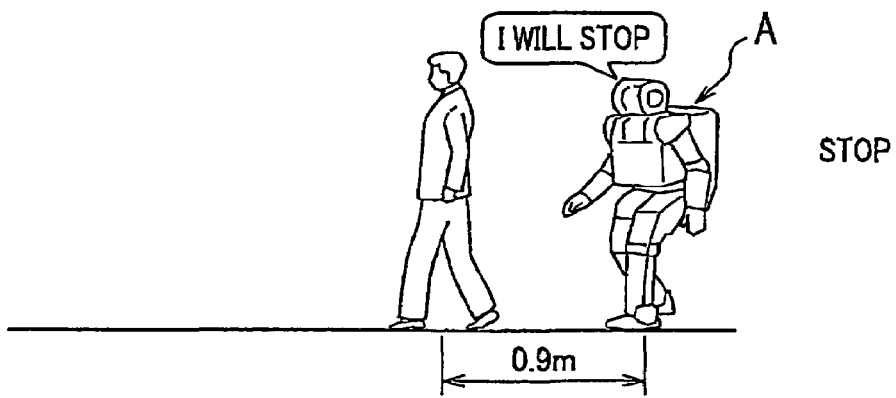

FIG. 5C shows the situation where the movable robot A approaches the person to be followed up, the means 57 for determining a response action judges that the movable robot A is collided with the person to be followed up, the movable robot A vocalizes "I will stop" from the voice outputting portion 62 via the speaker A, and then the movable robot A stops.

As described above, the apparatus 1 for controlling a movable robot makes the movable robot to follow up the person to be followed up at a prescribed interval. At the time of chasing the person, the person can instruct the movable robot A to start or stop the following up by gesture or voice and, thus, an appropriate communication can be made between the person to be followed up and the movable robot.

What is claimed is:

1. An apparatus for controlling a movable robot comprising a camera, moving means, and a device for outputting a sound, which comprises:
    means for recognizing a subject to be followed up, which recognizes the subject on the basis of an image taken by the camera;
    means for recognizing a distance to from the subject having been recognized by the means for recognizing a subject to be followed up;
    means for controlling movement, which controls said moving means so as to keep the distance from said movable robot to the subject, having been recognized by said means for recognizing a distance to the subject to be followed up at a predetermined distance; and
    means for controlling the outputting of a sound, which outputs a sound or a voice related to the distance to the subject,
    wherein the sound or the voice from the means for controlling the outputting of a sound informs the subject about a situation regarding the distance to the subject, so as to notify the subject to keep the distance from said movable robot to the subject at the predetermined distance, and said notifying operation comprises informing the subject whether it needs to stop moving and wait based on an increase in the actual distance, determined based on the predetermined distance, between the movable robot and the subject.

2. The apparatus according to claim 1, wherein said moving means of the movable robot moves by two legs' walking.

3. The apparatus according to claim 1, which further comprises means for holding map information, which holds map information of an area within which said movable robot moves, and
    wherein said means for controlling movement determines the actuation of said moving means based on the map information held in said means for holding map information.

4. The apparatus according to claim 3, wherein a restricted area which prohibits approach is set in said map information held in said means for holding map information.

5. The apparatus according to claim 1, wherein the subject to be followed up is a person, and which further comprises means for judging instruction from a person.

6. The apparatus according to claim 5, wherein said means for judging instruction from a person judges whether or not the robot follows up the person based on the results of recognition in which the person is recognized from the face image.

7. The apparatus according to claim 6, wherein said means for judging instruction from a person judges the instruction from the person based on at least one of posture, and gesture of said person.

8. The apparatus according to claim 5, wherein said means for judging instruction from a person judges the instruction from the person based on a voice vocalized from said person.

9. The apparatus according to claim 1, wherein said means for controlling the outputting of a sound changes a volume of voice outputted to said device for outputting a sound, based on a circumferential noise level.

10. A process for controlling a movable robot comprising a camera, moving means, and a device for outputting a sound, which comprises:
    a step for recognizing a subject to be followed up, which recognizes the subject on the basis of an image taken by the camera;
    a step for recognizing a distance to the subject having been recognized by the step for recognizing a subject to be followed up;
    a step for controlling movement, which controls said moving means so as to keep the distance to the subject having been recognized by said step for recognizing a distance to the subject to be followed up at a predetermined distance; and
    a step for controlling the outputting of a sound, which outputs a sound or a voice related to the distance to the subject,
    wherein the sound or the voice from the step for controlling the outputting of a sound informs the subject about a situation regarding the distance to the subject, so as to notify the subject to keep the distance from said movable robot to the subject at the predetermined distance, and said notifying operation comprises informing the subject whether it needs to stop moving and wait based on an increase in the actual distance, determined based on the predetermined distance, between the movable robot and the subject.

11. A computer-readable medium encoded with a program for controlling a movable robot comprising a camera, moving means, and a device for outputting a sound: which comprises having a computer to serves as means for recognizing a subject to be followed up, which recognizes the subject on the basis of an image taken by the camera;

means for recognizing a distance to the subject having been recognized by the means for recognizing a subject to be followed up;

means for controlling movement, which controls said moving means so as to keep the distance to the subject having been recognized by said means for recognizing a distance to the subject to be followed up at a predetermined distance; and means for controlling the outputting of a sound, which outputs a sound or a voice related to the distance to the subject, wherein the sound or the voice from the means for controlling the outputting of a sound informs the subject about a situation regarding the distance to the subject, so as to notify the subject to keep the distance from said movable robot to the subject at the predetermined distance, and said notifying operation comprises informing the subject whether it needs to stop moving and wait based on an increase in the actual distance, determined based on the predetermined distance, between the movable robot and the subject.

* * * * *